United States Patent [19]

Landau

[11] 4,171,530
[45] Oct. 16, 1979

[54] SYSTEM FOR THE ELECTRONIC EDITING OF VIDEO SIGNALS

[75] Inventor: Günter Landau, Scheppenhausen, Fed. Rep. of Germany

[73] Assignee: Robert Bosch GmbH, Stuttgart, Fed. Rep. of Germany

[21] Appl. No.: 777,825

[22] Filed: Mar. 15, 1977

[30] Foreign Application Priority Data

Mar. 17, 1976 [DE] Fed. Rep. of Germany ....... 2611113

[51] Int. Cl.$^2$ ...................... G11B 21/04; G11B 21/02
[52] U.S. Cl. ...................................... 360/70; 360/14; 360/75
[58] Field of Search .................. 360/70, 71, 75, 72, 360/14; 358/127, 301

[56] References Cited

U.S. PATENT DOCUMENTS

| 3,651,276 | 3/1972 | Clark | 360/70 |
|---|---|---|---|
| 3,654,398 | 4/1972 | Louth | 360/70 |
| 3,663,764 | 5/1972 | Trost et al. | 360/70 |
| 3,787,615 | 1/1974 | Foerster et al. | 360/70 |
| 3,898,694 | 8/1975 | Müller | 360/75 |
| 4,001,886 | 1/1977 | Bruinink | 360/75 |

*Primary Examiner*—Daryl W. Cook
*Attorney, Agent, or Firm*—Ernest F. Marmorek

[57] ABSTRACT

The invention relates to a system for electronic editing of video signals recorded by the diagonal track method on magnetic tape, comprising a rotatable head-wheel including video recording heads and video erasing heads, a head-wheel motor in driving relation with the head-wheel and controlled by a first control signal, moving means operable for moving said magnetic tape between two reels comprising a capstan, and a capstan motor in driving relation with the capstan and controlled by a second control signal, first monitoring means operable for generating a first tachometer signal proportional to the speed of the head-wheel motor, second monitoring means operable for generating a second tachometer signal proportional to the speed of the capstan motor, a source of a reference signal, a comparator coupled to the first tachometer signal and the reference signal and operable for generating the first control signal, generating means coupled to the reference signal and operable for generating a third control signal which is to be recorded on a control track portion of the magnetic tape during the recording of the video signals and which, during the playback of the video signals, is compared to the second tachometer signal to generate the control signal, a control device controlled by a third control signal and alternatively activating the video erasing heads and the video recording heads, and synchronizing means coupled to the first and second control signals and to the control device and comprising a shift register, and being operable for generating the third control signal.

3 Claims, 2 Drawing Figures

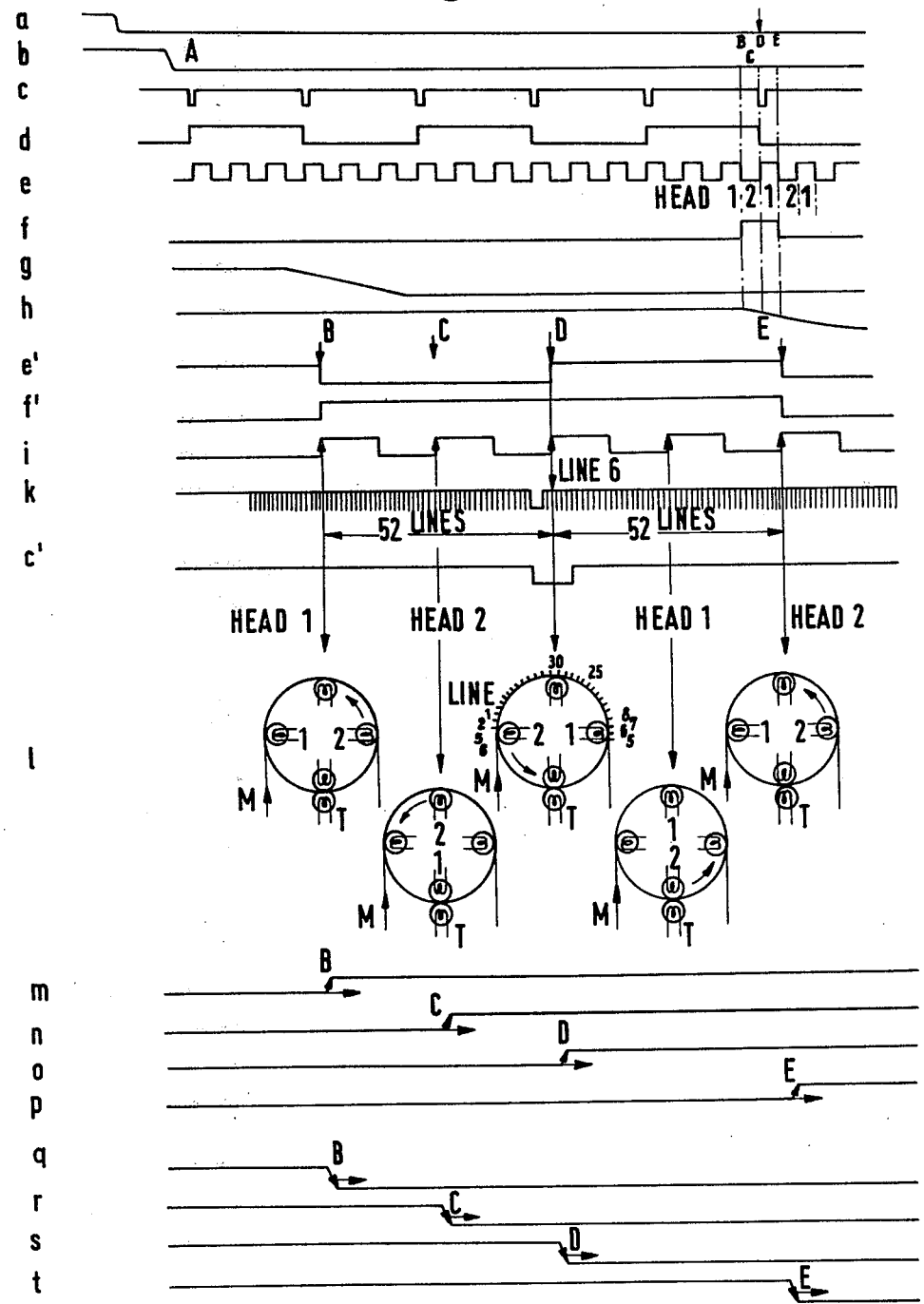

SYSTEM FOR THE ELECTRONIC EDITING OF VIDEO SIGNALS

CROSS REFERENCE TO RELATED APPLICATIONS

Reference is had to the following co-pending application by the same inventor, assigned to the same assignee as the instant patent application Ser. No. 760,353, filed Jan. 18, 1977.

BACKGROUND OF THE INVENTION

The invention relates to a system for the electronic editing of video-signals recorded by means of a diagonal-track-method on magnetic tapes for a video-recording/play-back-unit.

A typical prior art recording/playback-unit is known from the periodical "Radio Mentor Electronic", volume 41 (1975), #10, pages 402 to 403. In order to obtain as accurate an editing as possible for a diagonal-track-method, it is proposed according to the German Patent DT-OS No. 14 62 433 to imprint new recordings over the non-erased video-tracks. This presents a problem because the first recording is not erased, but is only attenuated. Thus, disturbing interferences can arise in the transition region during the play-back of the new recording. It is known from the periodical "Fernseh-, und Kino-Technik: (Television-, and Movie-Techniques)", 1971, No. 8, pages 279 to 285, that this disadvantage can be eliminated by using erasing-heads which rotate and are associated with respective video-heads of the rotating headwheel, so that the erasing-heads erase each diagonal-track shortly before the new recording.

Generally, two different editing types are distinguished:

In the case of the first editing type, the individual scenes are joined together, so that the new recording is joined free of disturbances to a present recording, so that during play-back, no discontinuities in the synchronous signal can occur to make the instrument lose synchronism or bring about image-disturbances. Customarily, a stationary main erasing-head which serves for the simultaneous erasing of video-, sound-, and control tracks and has to be arranged ahead of the head-wheel, is switched-in at once for this purpose. The rotating video-, and erasing-heads are switched-in and switched-out of the circuit by means of a control device in accordance with a time sequence dictated by the construction of the instrument.

In the case of a second editing type, individual video-tracks are newly inserted or imprinted in a present recording. Different tracks, in particular the control-track, are not erased by the main erasing-head in this editing type. As a result of this, the capstan-motor can be readjusted by means of the reference-signal which can be removed from the control-track, so that a disturbance-free edit-start and edit-end can be achieved. In the case of this editing type, the control-unit undertakes the time-wise accurate coordination of the heads present on the rotating head-wheel with respect to the momentary location of the moving magnetic tape.

In the case of prior art editing systems, the control unit includes individual delay-stages or timing-elements, for example, of monostable flip flops, which are temperature dependent and voltage dependent and thus can cause disturbances in the course of the switching operations.

Typically, these timing-elements are switched in series, whereby each timing-element is controlled by the preceding timing-element so that cumulative errors can occur.

It is the goal of the present invention to devise a system of the initially mentioned type, which is independent of the individual and, in part differently constructed timing-elements, which in turn control the accurate editing-course of the change-over points of time of the heads located on the head wheel.

SUMMARY OF THE INVENTION

One of the principal objects of the invention is a system for electronic editing of video signals recorded by the diagonal track method on magnetic tape, comprising a rotatable head-wheel including video recording heads and video erasing heads, a head-wheel motor in driving relation with the head-wheel and controlled by a first control signal, moving means operable for moving said magnetic tape between two reels comprising a capstan, and a capstan motor in driving relation with the capstan and controlled by a second control signal, first monitoring means operable for generating a first tachometer signal proportional to the speed of the head-wheel motor, second monitoring means operable for generating a second tachometer signal proportional to the speed of the capstan motor, a source of a reference signal, a comparator coupled to the first tachometer signal and the reference signal and operable for generating the first control signal, generating means coupled to the reference signal and operable for generating a third control signal which is to be recorded on a control track portion of the magnetic tape during the recording of the video signals and which, during the playback of the video signals, is compared to the second tachometer signal to generate the control signal, a control device controlled by a third control signal and alternately activating the video erasing heads and the video recording heads, and synchronizing means coupled to the first and second control signals and to the control device and comprising a shift register, and being operable for generating the third control signal.

The instant system has the advantage that through the timing-signal, the time-wise location of which, through logical combination of coupled reference signals for the mechanical drive of the magnetic tape and the head-wheel, corresponds to the one of the individual image-segments (52 lines) so that time-wise accurate control informations can be removed at the outputs of a shift register which, among others, effect a switching-over of the individual head-wheel-heads.

Further objects and advantages of the invention will be set forth in part in the following specification and in part will be obvious therefrom without being specifically referred to, the same being realized and attained as pointed out in the claims hereof.

BRIEF DESCRIPTION OF THE DRAWINGS

In the accompanying drawings:

FIG. 2 shows voltage-time-diagrams in connection with FIG. 1.

DESCRIPTION OF THE PREFERRED EMBODIMENT

Figure 1:
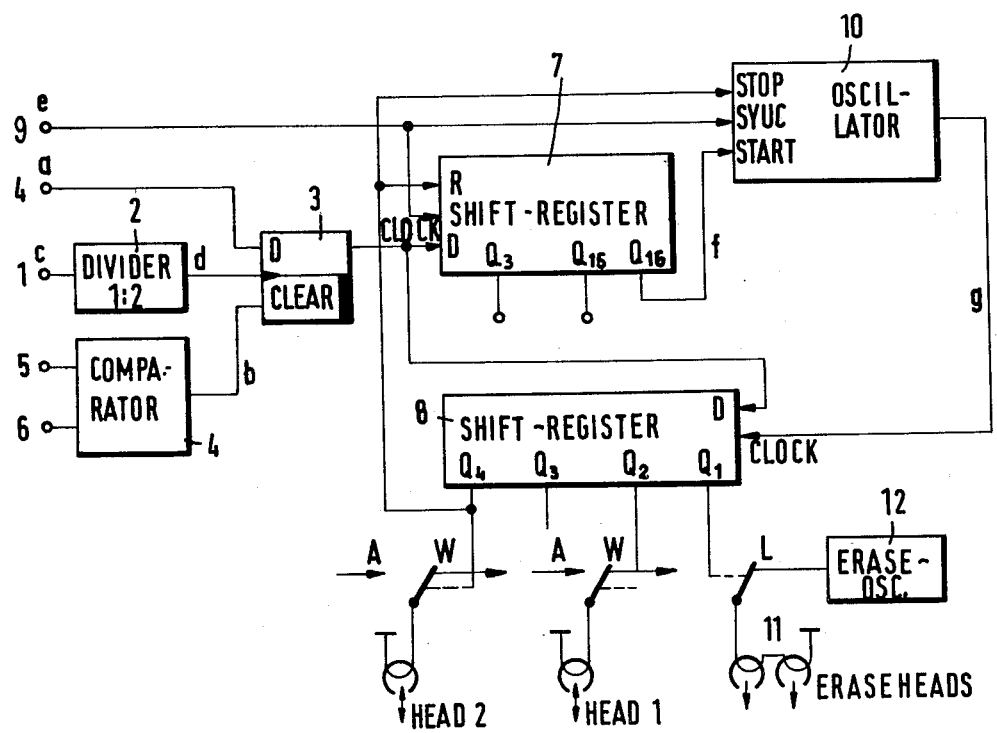
FIG. 1 shows a block-circuit-diagram according to the instant system.

In carrying the invention into effect, one of the embodiments has been selected for illustration in the accompanying drawings and for description in this specification, reference being had to FIGS. 1 and 2.

In FIG. 1, only the essential parts for the understanding of the instant invention are shown. In FIG. 1, a reference signal in the form of a vertical synchronous signal is conveyed via a terminal 1' and a frame synchronized frequency divider 2' to the clock-or timing-input terminal of a D-flip-flop 3. At the D-input terminal 4 of the D-flip-flop 3, a binary signal is applied, the level of which characterizes the desired operational state of the video-recording/playback unit. It is assumed that a high level (H) of the signal present at terminal 4 switches the video-recording/play-back unit to a play-back mode, and that a low level (L) switches it to a recording mode. The D-flip-flop 3 has available a reset input terminal independent of the clock frequency, or any timing signal. This reset-input terminal is connected to the output terminal of a comparator-stage 4', the task of which is to compare the signal at terminal 5' which is proportional in frequency, to the number of revolutions of a capstan-motor 15, and another signal at terminal 6, which is also proportional in frequency to the rotational rate of a head-wheel-motor 16, and to generate a binary signal having a low voltage-level (L), when attaining a predetermined number of revolutions per minute (RPM).

With the aid of the voltage-time-diagrams of FIG. 2, the interaction of the previously described signals will be described in what follows. For this purpose, let us assume that a signal, according to FIG. 2a, is present at the terminal 4; at the output terminal of the comparator-stage 4' a signal according to FIG. 2b; at the terminal 1' a signal according to FIG. 2c; and at the output of the frequency-divider 2', a signal according to FIG. 2d. At the output terminal of the D-flip-flop 3, when switching-over from playback to recording, that is, at a desired time of editing at the moment of the voltage-step in the signal of FIG. 2a, a signal change-over from L to H can only take place at the point in time A. This causes the D-input terminal of a first shift register 7 and the D-input terminal of a second shift register 8 to be set. At the output terminal $Q_{16}$ of the first shift register 7, the binary value present at the D-input terminal is shifted out again, following 16 head-wheel-tachometer pulse signals at terminal 9 received from a head-wheel 19. FIG. 2f shows the corresponding time-sequence. After three head-wheel tachometer pulse signals, a signal is present at the output terminal $Q_3$ of the first shift register 7, which signal initiates a blending of sounds. The sound-track is erased within 20 msec. as shown in FIG. 2g by means of a sound-erasing-head (which is not illustrated). After 12 additional head-wheel tachometer pulse signals, the recording of a new sound, as shown in FIG. 2h, begins within 20 msec., through the signal available on the output terminal $Q_{15}$ of the shift register 7.

The signal illustrated in FIG. 2f is shown in an enlarged timing scale in FIG. 2f'. The signal, at a point in time B, energizes an oscillator 10. The head-wheel tachometer pulse signals present at the terminal 9 have a frequency of 150 Hz. The oscillator 10 oscillates at a frequency of 600 Hz. The timing relationship of the pulse-signal available at the output terminal of the oscillator 10 is shown by the voltage-time-diagram of FIG. 2i.

The previously mentioned frequency-data result from the recording mode of the video-recording/play-back-unit used in this exemplified embodiment, in particular also by using instruments for NTSC-, and CCIR-signals. In the case of these instruments, complete half-images or fields, are not recorded per track, but only individual image segments. Each half-image or field includes 6 segments with 52 lines each. In the case of 6 segments, and by using two rotating video-heads, which rotate on the 50 mm diameter head-wheel 18, and are displaced by 180° with respect to one another, a pulse-sequence-frequency of the head-wheel tachometer pulse signal of 150 Hz results, which is due to 150 R.P.M. of the head-wheel 19. Therefore, for the four heads which are displaced by 90° along the periphery of the rotating head-wheel, a switching signal of a frequency of 600 Hz will be required. The timing relationship of this pulse-signal produced at the output terminal of the oscillator 10, with respect to the pulse-signal illustrated in FIG. 2e', is shown in FIG. 2i in the area between the points of time B, C, D and E. FIG. 2c' shows the vertical synchronous reference signal shown in FIG. 2c on a correspondingly larger time scale.

In section 1 of FIG. 2, five different head-wheel positions are shown. It is assumed that the magnetic tape M is guided around the head-wheel in an opposite direction to the direction of rotation of the head-wheel, as shown by the arrow. The head designated with 1 represents the first video-head, and the head designated with 2, the second video-head. The heads lying between the heads 1 and 2 are two video-erasing-heads 11 which are electrically connected in series. The additional head T located at the periphery of the rotating head-wheel, serves for making the head-wheel tachometer pulse signal available thereon.

As a function of the timing pulse signals shown in FIG. 2i, the binary value present at the D-input terminal of the second shift-register 8 is shifted through the shift register 8. At the point in time B, shown in FIG. 2m, the following preparatory operations take place: a non-illustrated frequency-modulator is switched into circuit; an electrical connection to the video-head 1 is established; and an erasing-head for the erasing of the control-track, is switched into circuit. At the point in time C, the information entered into the shift register 8 reaches the output terminal $Q_1$ and connects the series connected erasing-heads 11 to an erasing oscillator 12, as shown in FIG. 2m. At the point in time D shown in FIG. 2o, the actual editing process takes place. Thereby, the signal to be recorded is applied to the head 1, and the electrical connection is switched from play-back P to recording R for head 2. When attaining the point in time E shown in FIG. 2p, the video-signal to be recorded is coupled to the head 2. When editing scenes, or adjoining scenes, a recording is made onto new control track by means of a stationary recording head and the capstan-motor is synchronized with the synchronous signal of the video-signal to be recorded.

At the conclusion of editing, that is, when switching over the instrument from recording to play-back, the resetting operation is undertaken by means of the signal present at the clock- or timing-input terminal of the D-flip-flop 3, along with the next following 25 Hz-pulse. The output of the D-flip-flop 3 takes place on the low (L)-state. Accordingly, the D-input terminals of the shift registers 7 and 8 are ready to accept signals. The start-stop-oscillator 10 generates a new timing-signal, which now determines the disconnect - time-sequence. Based on FIG. 2q, the head 1 is subsequently electrically disconnected and the stationary erasing-head for the control track is switched out of circuit. Subsequently, at the point in time C shown in FIG. 2r, the rotating erasing-heads 11 are disconnected from the erasing oscillator 12, and at the point in time D shown in FIG. 2s, the signal-current to the head 1 of the video-signal to be recorded is interrupted, and the head 2 is electrically switched from recording R to play-back P. As a last step, the following takes place at the point in time E shown in FIG. 2t, namely, the cut-off of the signal to the head 2, inhibiting the recording of a new control-track, as well as disconnection of the FM-modulator, and the switching of the instrument to play-back. In connection therewith, and as a result of a step impulse, at the output terminal $Q_4$ of the shift register 8, the shift register 7 is reset via the reset input terminal, and the start-stop-oscillator 10 is stopped in its operation via the stop-input terminal. For a better synchronization of the start-stop-oscillator 10, the latter is synchronized via a synchronous signal (sync) with the head-wheel-tachometer pulse signal present at terminal 9.

When inserting specific scenes into an already existing recording, the erasing of the control-track does not take place.

I wish it understood that I do not desire to be limited to the exact details of construction shown and described, for obvious modifications will occur to a person skilled in the art.

Having thus described the invention, what I claim as new and desire to be secured by Letters Patent, is as follows:

1. A system and a circuit for electronic editing of video signals recorded by the diagonal track method on a magnetic tape, comprising, in combination:
   a rotatable head-wheel including a plurality of video recording heads and video erasing heads;
   a head-wheel motor in driving relation with said head-wheel and controlled by a first control signal;
   moving means operable for moving said magnetic tape between two reels and comprising a capstan, and a capstan motor in driving relation with said capstan and controlled by a second control signal;
   first monitoring means operable for generating a first tachometer signal proportional to the speed of said head-wheel motor;
   second monitoring means operable for generating a second tachometer signal proportional to the speed of said capstan motor;
   a source of a reference signal; said first monitoring means including a comparator coupled to said source of the reference signal and operable for generating said first control signal; and
   generating means coupled to said source of the reference signal including a control device and synchronizing means, said synchronizing means being operable for generating a third control signal which is to be recorded on a control track portion of said magnetic tape during the recording of video signals and which during the playback of the video signals, is compared to said second tachometer signal to generate said second control signal,
   said control device being controlled by said third control signal and being operable for alternatively activating and deactivating said video erasing heads and said video recording heads,
   said synchronizing means receiving said first and second control signals, being coupled to said control device, and comprising a shift register.

2. The system according to claim 1, wherein said shift register includes an information-input terminal, a timing-input terminal, and a plurality of output terminals, one of said output terminals being coupled to said video erasing heads, and further comprising an erase oscillator coupled to said one output terminal, at least another output terminal being coupled to one of said recording heads, and wherein said synchronizing means further comprises an oscillator including a start input terminal and a stop input terminal, and an output terminal, first connecting means for connecting the oscillator output terminal to the timing-input terminal of said shift register and the stop-input terminal to said another output terminal of said shift register, and wherein said generating means includes another shift register including resetting-, timing-, and information-input terminals, and an output terminal connected to the start-input terminal of said oscillator, second connecting means for connecting said stop-input terminal of said oscillator to said another output terminal of the first shift register, said timing-input terminal of said another shift register receiving timing impulses of said head-wheel, a flip-flop including a timing-independent resetting-input terminal and having an output terminal connected to the information input terminal of said shift register and the information-input terminal of said another shift register, an input-information terminal of said flip-flop receiving a binary signal for change-over of the system from recording to play-back or from play-back to recording, and a timing input terminal of said flip-flop receiving a signal of one half of the frequency of the vertical signal.

3. The system according to claim 2, wherein the binary signal having a predetermined value is conveyed to the resetting-input terminal of said flip-flop, so that the resetting of said flip-flop is inhibited in the presence of a predetermined rate of revolutions of said capstan, and of said head-wheel.

* * * * *